(12) United States Patent
Weidman et al.

(10) Patent No.: US 7,266,805 B2
(45) Date of Patent: Sep. 4, 2007

(54) SYSTEMS AND METHODS FOR GENERATING SOFTWARE AND HARDWARE BUILDS

(75) Inventors: Lawrence James Weidman, Pittsburgh, PA (US); Manas Chandra Saksena, Pittsburgh, PA (US); Jason Scott McMullan, Pittsburgh, PA (US)

(73) Assignee: Timesys Corporation, Pittsburgh, PA (US)

( * ) Notice: Subject to any disclaimer, the term of this patent is extended or adjusted under 35 U.S.C. 154(b) by 509 days.

(21) Appl. No.: 11/019,961

(22) Filed: Dec. 22, 2004

(65) Prior Publication Data

US 2006/0136904 A1 Jun. 22, 2006

(51) Int. Cl.
*G06F 9/44* (2006.01)
(52) U.S. Cl. ........................ 717/101; 717/122; 717/162
(58) Field of Classification Search ................ 717/101, 717/122, 123, 136, 140, 141, 162–167; 707/102, 707/203; 345/419
See application file for complete search history.

(56) References Cited

U.S. PATENT DOCUMENTS

| 5,966,715 A * | 10/1999 | Sweeney et al. ............. 707/203 |
| 6,215,495 B1 * | 4/2001 | Grantham et al. .......... 345/419 |
| 6,668,257 B1 * | 12/2003 | Greef et al. ................. 707/102 |
| 6,742,175 B1 * | 5/2004 | Brassard ..................... 717/107 |
| 2005/0044531 A1 * | 2/2005 | Chawla et al. .............. 717/122 |

* cited by examiner

*Primary Examiner*—William H. Wood
(74) *Attorney, Agent, or Firm*—Morgan, Lewis & Bockius LLP

(57) ABSTRACT

Systems and methods for generating a plurality of different software builds from a common base code and different combinations of other components are described in the context of a collaborative framework in which multiple parties maintain a shareable base of software used for generating such builds. Systems and methods for generating a plurality of different hardware build designs from a common collection of hardware elements and different combinations of other hardware components are also described.

13 Claims, 5 Drawing Sheets

SYSTEMS AND METHODS FOR GENERATING SOFTWARE AND HARDWARE BUILDS

FIELD OF THE INVENTION

The present invention relates generally to systems and methods for generating a plurality of different software builds from a common base code and different combinations of other components, and to a collaborative framework in which multiple parties maintain a shareable base of software used for generating such builds. The present invention also relates generally to systems and methods for generating a plurality of different hardware build designs from a common collection of hardware elements and different combinations of other hardware components.

BACKGROUND OF THE INVENTION

One problem in the software field is the generation and support of numerous open-source distributions (e.g., different distributions of an open-source operating system (OS)) based on a common base of components and practices, but including many differences among the distributions. While many people are currently able to build such an OS kernel and upgrade a system with the new kernel, the ability to accomplish such builds in connection with a complete distribution represents a harder problem.

A complete distribution is much more than a kernel, and has several components including: an installer, or possibly several installers to accommodate multiple targets; development tools (for embedded systems, these are likely to include cross development tools from a selection of platforms); a root file system including all the software outside the kernel that is necessary to boot and operate the system (a set of shared library components would normally be included a part of the root file system); and documentation. These components all interact. In many cases, components require special versions of other components in order to function. Components may even require non-standard "patches" applied to other components to work together. Harmonizing hundreds of components is a combinatorial problem. Many combinations simply will not work with any set of versions and patches. Thus, assembly of a working distribution is a hard problem that gets rapidly harder as components are added to the distribution.

The distinction between a complete distribution (e.g., a commercial-quality distribution) and a modified kernel provides one motivation for the present invention. Consider a company that has created a new single-board computer (for instance) and wants to support Linux on that platform. The company can contract for the software with a company that supplies a Linux distribution, but that is a limited resource and consequently the process is probably slow and expensive. The company can also download the Linux sources and do the port themselves. That approach, however, gives the company only a working kernel, not a complete distribution. Even if the company has created a working distribution, a commercial Linux vendor is unlikely to adopt the distribution and provide support and maintenance because the "wild" board-support package (BSP) is likely to differ from the distribution the vendor provides. Since a "wild" BSP is, by definition, created outside the commercial Linux vendor's control there is no practical way to be certain that the distribution meets the vendor's standards. The current usual practice is for the hardware vendor to do a Linux port to their computer, and then pass that port to a company that builds a Linux distribution. That company uses the code from the hardware vendor as a guide and repeats much of the hardware vendor's work as the Linux vendor does a port of their distribution to the new platform. For the Linux vendor, this is faster than doing the port from scratch, but it is still time-consuming and expensive. The alternatives for the hardware vendor are to supply and support a Linux distribution (an expensive, long-term commitment), or to provide the raw kernel to their customers and leave them with a generally non-professional operating system package.

The prior art operates on the model that people either contribute to one of the broadly-supported distributions, or they take a standard distribution, modify it independently, and depart from the standard. For most of the prior art Linux distributions, departing from the distribution is relatively easy because the "machinery" for building the distribution is publicly available, but the new distribution is now an independent entity that needs an ongoing support effort. Contributing to the standard distribution is either the job of the "owner" of the distribution, or it has (necessarily) a careful community-based review process, and changes might not be accepted into the distribution even though someone needs those changes for their system.

In order to provide a system that lets users easily build a custom distribution, then easily pass that distribution back to an organization that can easily assume ongoing responsibility for it, three distinct problems need to be solved: (1) easy assembly of a certified distribution containing standard components and possibly special components; (2) easy transition of any work back to the shared base; and (3) scalable support for all distributions built with the system. Prior art systems solve the scalable support problem by strictly limiting the number of supported distributions/products. That makes problem three trivial, but totally fails to address problem one. Prior art systems solve problem two with a social/code review process on submission to the distribution. That has proven efficient at maintaining high quality, but it is labor intensive and offers no path for adding code to the distribution that is not widely supported by the community. What is needed is a single system that solves all three of the problems, and thereby permits users to easily build a custom distribution, and then pass that distribution back to an organization that can easily assume ongoing responsibility for it.

SUMMARY OF THE INVENTION

The present invention is directed to a system and method for generating a plurality of different software builds. Each of the different software builds is generated from a common base code and different components selected from a set of components. For each different software build, the following steps are recursively applied to generate components used by the build: (i) applying the common code and a combination of two or more components making up the build to a system that automatically detects potential conflicts associated with the combination of components; (ii) generating a resolution for each potential conflict detected; and (iii) using a computer-implemented merge system to generate the software build from the common code, the combination of components associated with the build, and each resolution generated for the build.

In response to receipt of a code update to an earlier version of either the common code or a given component in the set, each software build previously generated using the earlier version is automatically identified, and for each software build identified the following steps are applied recursively to update components associated with the build: (i) applying the code update and any other code or components associated with the build to a system that automatically detects potential conflicts associated with the code update; (ii) generating a resolution for each potential conflict detected in step (ii); and (iii) using the computer-implemented merge system to generate the software build from the code update, any other code or components associated with the build, and each resolution generated for the build. The process is repeated as further updates are received for either the common code or components in the set.

The plurality of different software builds generated by the present invention include at least first and second software builds that are related in accordance with a directed acyclic graph (DAG), wherein the common base code corresponds to a root of the DAG, and the first and second software builds are each represented on a different branch of the DAG. The plurality of different software builds may also include at least one linear sequence of software builds. The conflict resolution performed by the present invention may be accomplished automatically using software or manually by a programmer.

The methodology for generating a plurality of different software builds described above is also applicable to generating a plurality of different hardware builds.

The present invention is also directed to a collaborative system and method by which multiple parties maintain a sharable base of software units that represent software features submitted by the parties, and generate a plurality of different software builds. Each of the different software builds is generated from a common base code and one or more different software units. The common base code is maintained in a central code repository. A common certification standard accepted by each of the different parties submitting additions is provided. For each different software build associated with a given software unit submitted by one of the parties, the build is determined to be a certified build if the build is in conformance with the common certification standard. A certification history is associated with each software unit stored in the central code repository. The above process may be repeated for each software unit that a party submits to the central code repository. The plurality of software builds include at least first and second software builds that are related in accordance with a DAG, wherein the common base code corresponds to a root of the DAG, and the first and second software builds are each represented on a different branch of the DAG.

In one embodiment, each of the different parties is provided with access to the common base code stored in the code repository, at least a subset of software units stored in the central code repository, and at least a subset of the certified builds stored in the central code repository. The integrity of software units stored in the central code repository may be measured by the common certification procedure, which in turn may be directed at complete builds incorporating one or more of the units stored in the central code repository.

BRIEF DESCRIPTION OF THE DRAWINGS

Throughout the drawings, like numerals are used to designate the same elements.

DETAILED DESCRIPTION OF THE PREFERRED EMBODIMENT

The present invention is applicable to any content that can usefully be divided into reusable components, supported centrally and maintained in a centralized or distributed fashion, and assembled into specialized aggregate products. Examples where the present invention is applicable include open source projects and commercial software products that are sold as custom builds (such as payroll systems), as well as content that is not computer software, such as hardware builds. The present invention is particularly applicable to software packages that contain multiple components that can be combined (but only in certain ways), may need some customization for each combination, and where the set of components is open to "members" for use and contribution. The "owner" of the process accepts contributions and may provide ongoing support and maintenance for them.

Figure 1:
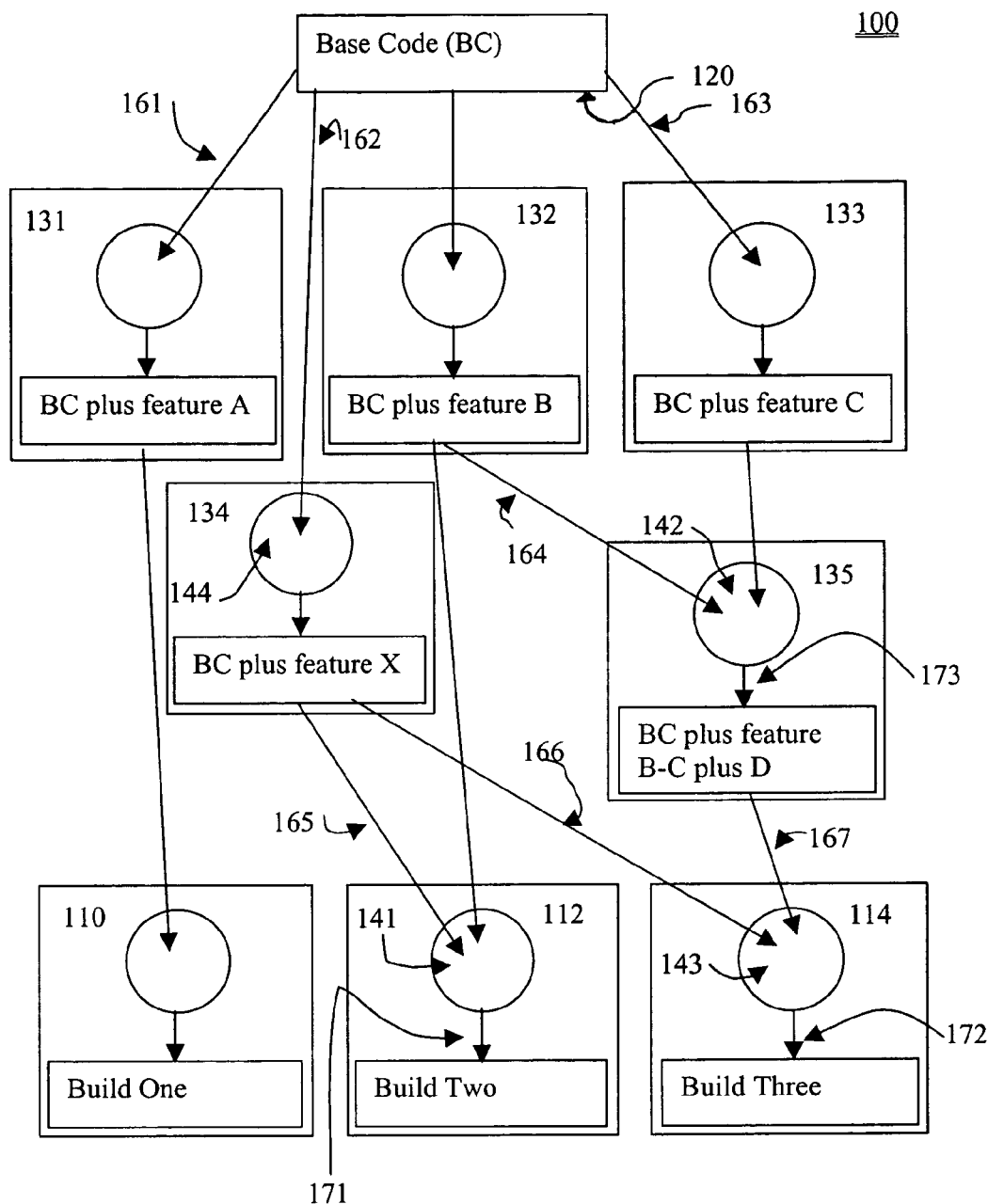
FIG. 1 is a directed acyclic graph (DAG) representing methodology for generating a plurality of different software builds from a common base code and different components selected from a set of components, in accordance with the present invention.

Referring now to FIG. 1, there is shown a directed acyclic graph (DAG) 100 representing methodology for generating a plurality of different software builds 110, 112, 114 from a common base code 120 and different components selected from a set of components (e.g., Feature A, Feature B, Feature C . . . Feature X), in accordance with the present invention. Each of the different software builds 110, 112, 114 corresponds, for example, to a complete distribution of an open source operating system.

DAG 100 has base distribution 120 at its root, three kinds of nodes and two kinds of edges. The three types of nodes include work nodes, merge points and builds. Each merge point is associated with a work node or build node, to which it is connected with a work delta edge. A work node represents a complete set of source embodying some identifiable feature like a new function (depicted generally as Feature A, Feature B, Feature C . . . Feature X), or support for some hardware, as well as the base distribution. This node may also be called a feature node. Examples of work nodes (or feature nodes) include nodes 131, 132, 133, 134 and 135, shown in FIG. 1. A merge point node represents a combination of non-conflicting deltas (i.e., code changes that do not conflict with other code changes represented by the combination) from work nodes, or an empty delta from the base code. A merge point node is not a complete image (or build). Merge point nodes are specified by identifying the set of work nodes and build nodes that they depend on. Merge points descended from the base code are a special case. They have one incoming edge (from the base code) and the incoming edge does not denote any delta from the base code. Examples of merge point nodes include nodes 141, 142, 143, and 144 shown in FIG. 1. In one embodiment, a build node is derived from a merge point node by merging the base code with all of the edges directed to the merge point node. The build node or work node that depends on the merge node must include any conflict resolution required by the conflicts detected in generation of the merge node. The build node is expected to compile the build, which could be tested and released as a product. A build node can also be used as a feature node since it represents a set of integrated features. Examples of build nodes include nodes 110, 112, 114, shown in FIG. 1.

Each node, whether merge point, work node, or build node has an associated sequence number. These numbers reflect the relative "age" of the last complete construction of the node, so a high-resolution time stamp would be a practical implementation of the sequence number, so would a global sequence number that increments each time a node is updated.

The two edge types included in DAG 100 correspond to work deltas, and derivation edges. Work deltas represent the changes that make up a feature and they also include any conflict resolution related to the node. In the preferred implementation, these deltas represent the difference between the node and its immediate parents in the graph, but they may by an obvious extension of the algorithms here, be computed between the root distribution 120 and a feature node that represents the changes to implement the feature. Derivation edges correspond to edges that run from the base code, work nodes or build nodes to merge nodes. Examples of derivation edges include edges 161-167, shown in FIG. 1. Conflict resolution deltas may be generated automatically by the same software used to implement the other functions of the present invention, or using other separate software tools. Such conflicts can include, for example, inconsistent changes to a common line of code.

In one embodiment, in order to implement DAG 100, an engineer: (1) specifies the nodes that should be merged to generate a build node (these are preserved in a node definition file) (2) generates any deltas required to resolve conflicts discovered in the merge process, and (3) codes the feature that will distinguish this work node. The engineer then tests the resulting build node, fixes any problems, and carries on with activities like generating technical documentation.

The sum of conflict resolution and other coding performed to generate a work or build node is summarized in the difference between the merge node and the associated work node. The edge representing this difference is a work delta. Examples of work delta edges include edges 171, 172, 173, shown in FIG. 1.

DAG 100 may be implemented using software that functions to automatically generate computed edges. Work nodes may be generated by hand using other software development tools. Alternatively, the software used to generate the computed edges may be also be used to automatically generate at least part of the work nodes.

Each derivation edge represents the delta between the base code and the node at the beginning of the derivation edge. This difference can be stored with the graph and only recomputed when an ancestor is updated or the shape of the DAG is altered, or the deltas for the derivation edge may be derived dynamically.

Figure 2A:
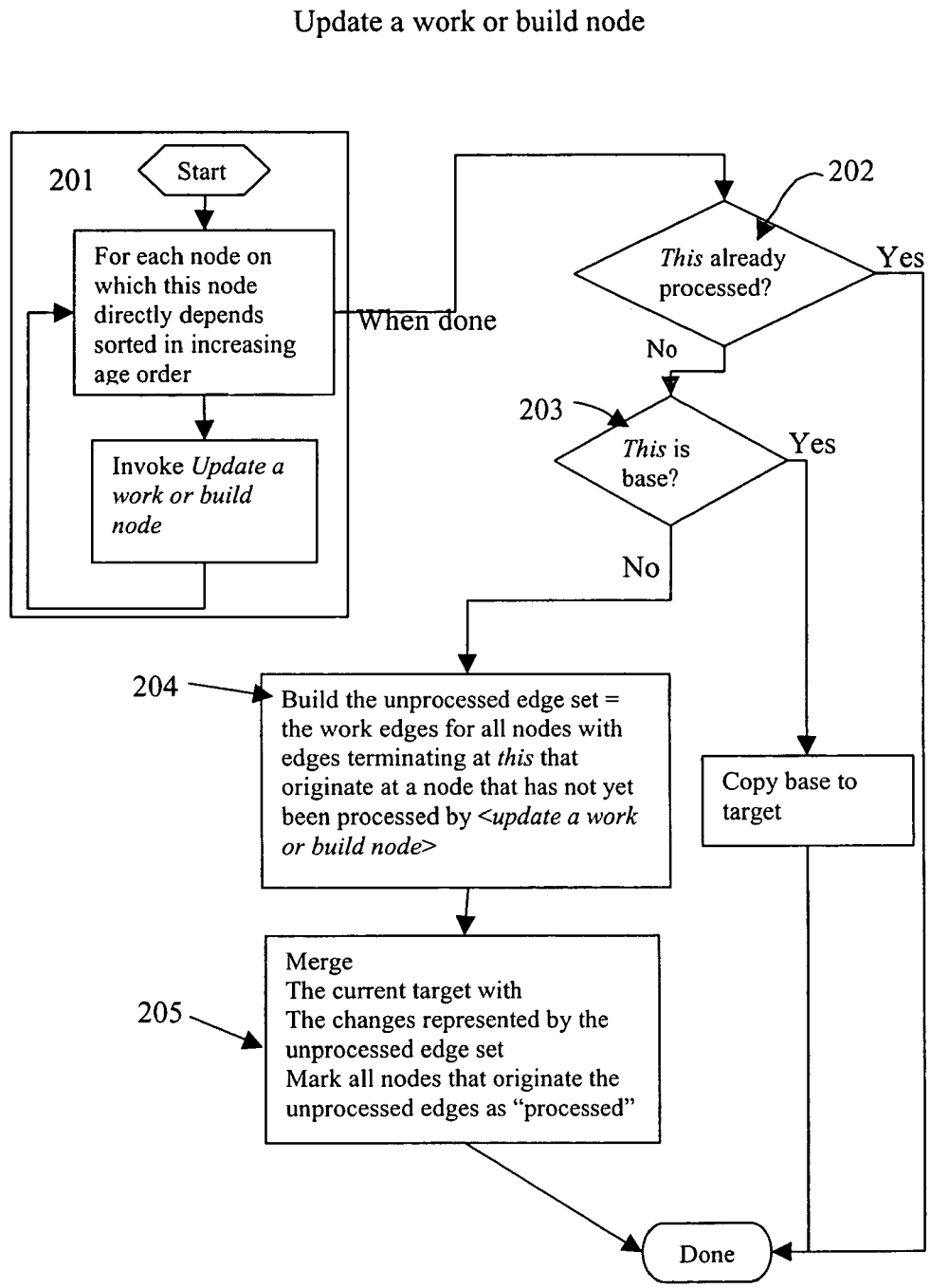
FIG. 2A is a flow diagram illustrating the operation of a method for automatically generating a work or build node from a common base code and selected edges, in accordance with the present invention.
Figure 2B:
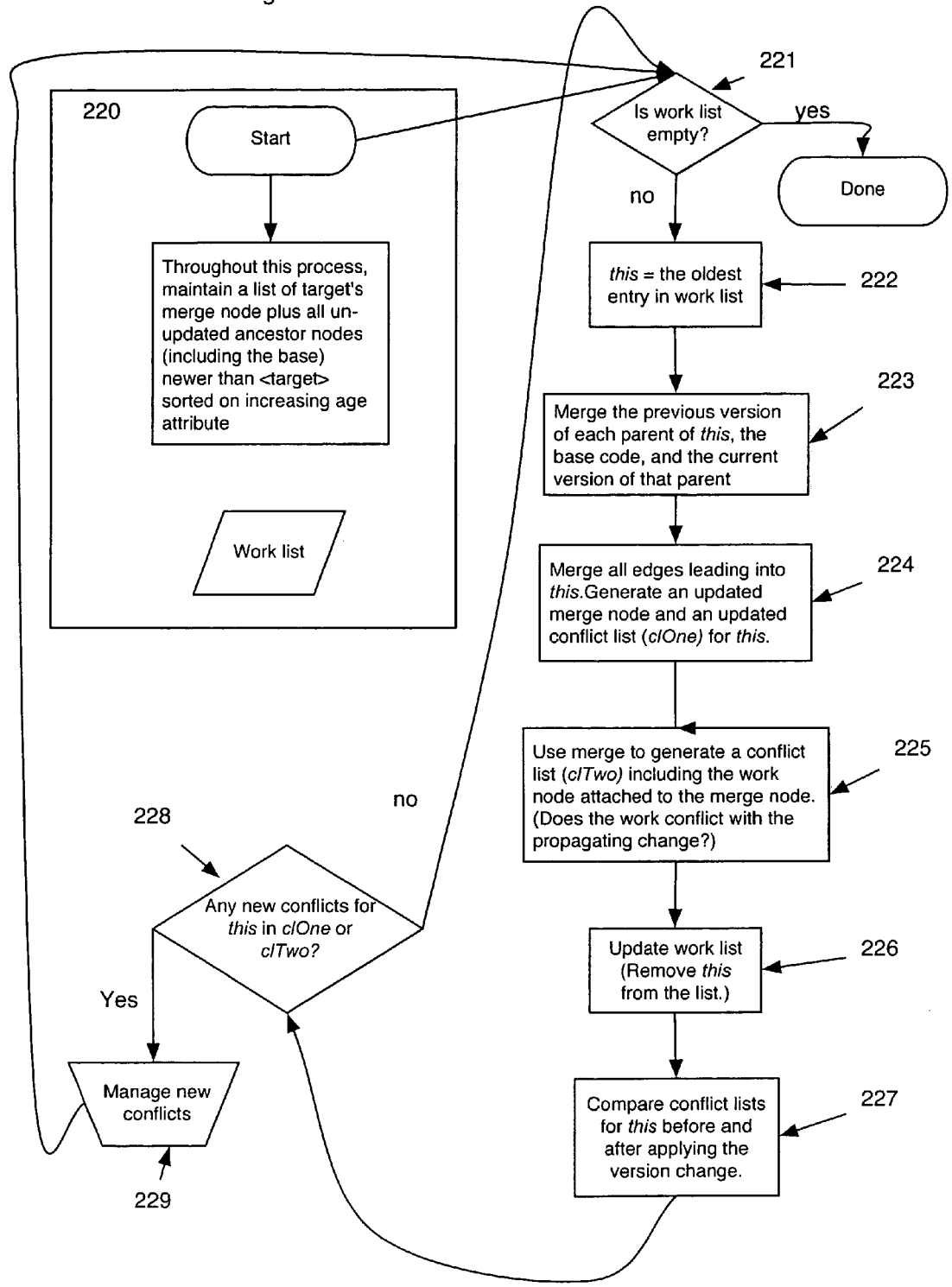
FIG. 2B is a flow diagram illustrating the operation of a method for responding to an external update of the common base code or a work node, in accordance with the present invention.
Figure 2C:
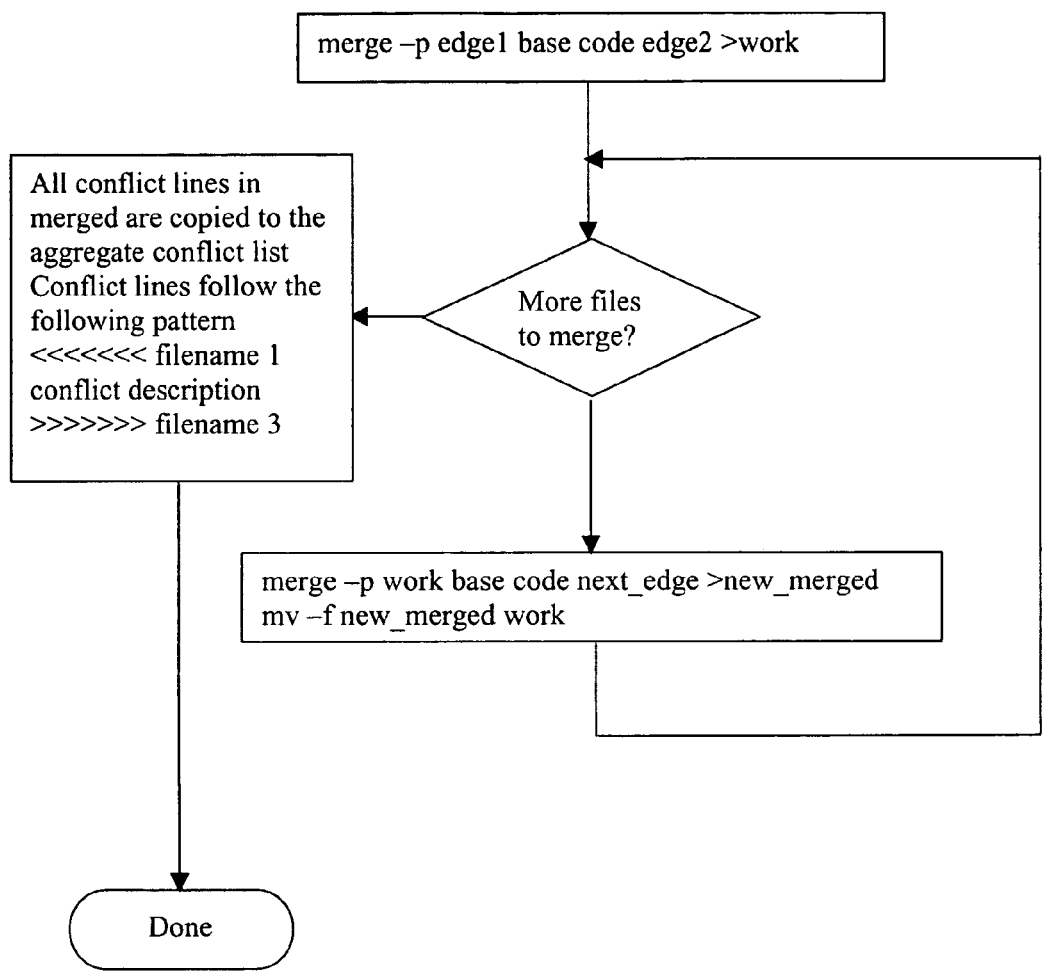
FIG. 2C is a flow diagram illustrating a process for using the standard Unix merge utility to merge more than two sets of changes to a base code.

The system generates the build node with initial contents reflecting the application of the merge of the base code with parent work nodes. In one embodiment, the build node is generated using the merge utility(e.g., the standard Unix merge utility) as follows:

1. merge edge1 base_code edge2 to work
2. merge work base_code edge3 to work
3. merge work base_code edge4 to work
. . .

as depicted in FIG. 2C.

Resolution of any conflicts takes place in the work or build node (typically) before any other changes are made. Conflict resolution may be performed on the aggregate conflict list (identified on FIG. 2C), or it may be performed based on the conflict list from each merge as it is generated.

In addition to building the generated DAG edges and running the merge process, the present invention can be used to automatically implement an update-propagation operation. The deltas represented by the DAG edges apply to a specific version of the DAG. Users may supply external updates to the software represented by the DAG in the form of new features or enhancements, which correspond to changes to a work node. Also, the base code that forms the root of the DAG might be updated. In the present invention, change propagation automatically occurs if someone updates a work node that other nodes are using, or if the base code itself is updated. In these cases, the deltas represented by the edges in the DAG may need to be updated, and the present invention walks through the DAG rebuilding all necessary edges. When new conflicts are detected, the present invention calls for new conflict resolution. This process is driven by the sequence numbers that effectively time-stamp the nodes. Each time a node update is requested for node t, the update mechanism first checks all paths from node to the base code. Next, proceeding from the base code along each path to node t, it determines whether each merge node, x, depends on a node, y, which has been updated more recently. When it finds such a dependency it:

1. Merges the latest version of y with the base code and the original y.
2. Merges the updated y from step 1 with the base code and x producing a current version of x and (possibly) a conflict list.
3. A conflict resolution is supplied either manually or automatically
4. The conflict resolution from step three is added to the x changes embodied in the work node for x.
5. Updates the age of x.

The process proceeds through the nodes on all paths from the base to node t, processing the nodes in increasing sequence number order. Note that when the process is complete each node will have a greater sequence number than any of its ancestors (since each node is updated after its ancestors.)

When the update is complete, there will be a new set of deltas that work for all the updated nodes on the path from the base code to t in the DAG. The mechanism above assumes that all nodes should be kept current, but greater flexibility can be accommodated by, for instance, storing the DAG in a source control system that stores versions of the DAG—for instance, a DAG version per base code version. In one embodiment, individual updates could be selected; alternatively, the present invention can be applied to all updates up to a specified date.

The present invention may be implemented using a source code management (SCM) system such as Perforce. The source code control system might preserve the DAG information, or, since source control systems frequently operate by storing deltas between each version of code and its previous version, the SCM itself might implement much of the merge and conflict resolution logic.

Referring now to FIGS. 2A-2C, there are shown flow diagrams illustrating portions of a method for generating a plurality of different software builds from a common base code and different selected edges, in accordance with the present invention. It will be understood by those skilled in the art that various aspects of the functionality shown in FIGS. 2A-2C can be implemented in software on any suitable hardware platform including, for example, one or more servers.

Referring specifically to FIG. 1, each of a plurality of different software builds (e.g., builds 110, 112, 114) is generated from a common base code (e.g., base code 120) and different components selected from a set of components (e.g., Feature A, Feature B, Feature C . . . Feature X). Referring now to FIG. 2A, for a selected software build, build, block 201 recursively applies the rest of the flow chart to the DAG. The condition at 202 prevents any node from being processed more than once even if it appears on more than one path. After a node has been processed through done it will be ignored if it is found on another path. Condition 203 makes a special case of the base code. The first direct dependency on the base code causes a copy of the base code to be copied to the build merge node. Nodes other than the base code are processed through bocks 204 and 205.

More specifically, step 204 builds the unprocessed node set. It finds each node on which this node directly depends. From those nodes it selects the work edges for the nodes which have not already been used in a recursively visited instance of step 204. The result of these two selections is the unprocessed edge set.

In step 205, all the deltas from the unprocessed edge set are merged with the code being constructed for the build node. The process of the multi-way merge is drawn in more detail in FIG. 2C. This merge may generate a conflict list. This conflict edge is only of interest if this is the target build node.

When the process represented by FIG. 2A has completed its recursive processing, the constructed code will contain the base code modified by all the changes represented by the paths from the target build to the base code. The conflict list generated by the final merge will indicate to the developer if the derivation of the build node generated any conflicts that should be resolved. (Conflicts from other merges were, by assumption, resolved when that node was coded.) The changes made to resolve the conflicts and add node-specific features are preserved in the node's work edge, and are merged with the merge node to produce the work node.

The plurality of different software builds generated using the functionality shown in FIGS. 2A and 2B include at least first and second software builds (e.g., builds 112, 114) that are related in accordance with a DAG (such as DAG 100), wherein the common base code corresponds to a root of the DAG, and the first and second software builds are each represented on a different branch of the DAG. The plurality of different software builds may also include at least one linear sequence of software builds.

Referring now to FIG. 2B, there is shown a flow diagram illustrating the operation of a method for responding to an external update of the common base code or a work node, in accordance with the present invention. The operation illustrated in FIG. 2B may be selected for a node (target in FIG. 2B) to incorporate in target all updates to nodes on which target depends. In the simplest case this process finds the changed nodes, computes the difference between the version the target is based on and the current version, and merges those differences with the target code. Additional complexity appears because the update may change conflicts that were discovered and managed previously. This issue applies to the target node and to any nodes between the target and changed nodes. Thus, the bulk of the process is dedicated to identifying new conflicts and calling for conflict resolution at each node where the conflicts change. At the end of its execution the nodes in the DAG that require modified conflict resolution will have updated work edges, and nodes on all paths from updated nodes to the target will have updated age numbers.

The method in FIG. 2B is driven from a list of nodes generated and maintained by step 220. This list is generated by a standard graph traversal algorithm, and a sort. It can be maintained by standard list-maintenance algorithms.

Steps 222 through 228 are repeated while there are entries in the work list maintained by 220. In step 222 the oldest node is selected from the work list. This node is either the base code (from FIG. 1) or a node that can be treated as a work node. It will be referred to as this. In step 223, the difference between the code represented by this and the updated version of this is computed. This difference could be only a direct result of propagated external changes, or it could include the effects of conflict resolution in ancestor nodes.

In steps 224 and 225, the edges into this including the updated parents are merged. In step 227 the conflict lists with and without the updates are compared. If the update changes the conflict list then conflict resolution is required (step 229). After the merge completes this is removed from the work list (step 226).

The methodology for generating a plurality of different software builds described above is also applicable to generating a plurality of different hardware builds. In accordance with this aspect of the invention, information associated with a common collection of hardware elements and information associated with different hardware components selected from a set of hardware components is first reduced to text. The conflict-detecting merge utility described above is then applied to the text in order to generate different hardware builds and perform automatic updating of hardware components, using the same methodology discussed above in connection with FIGS. 1 and 2.

Figure 3:
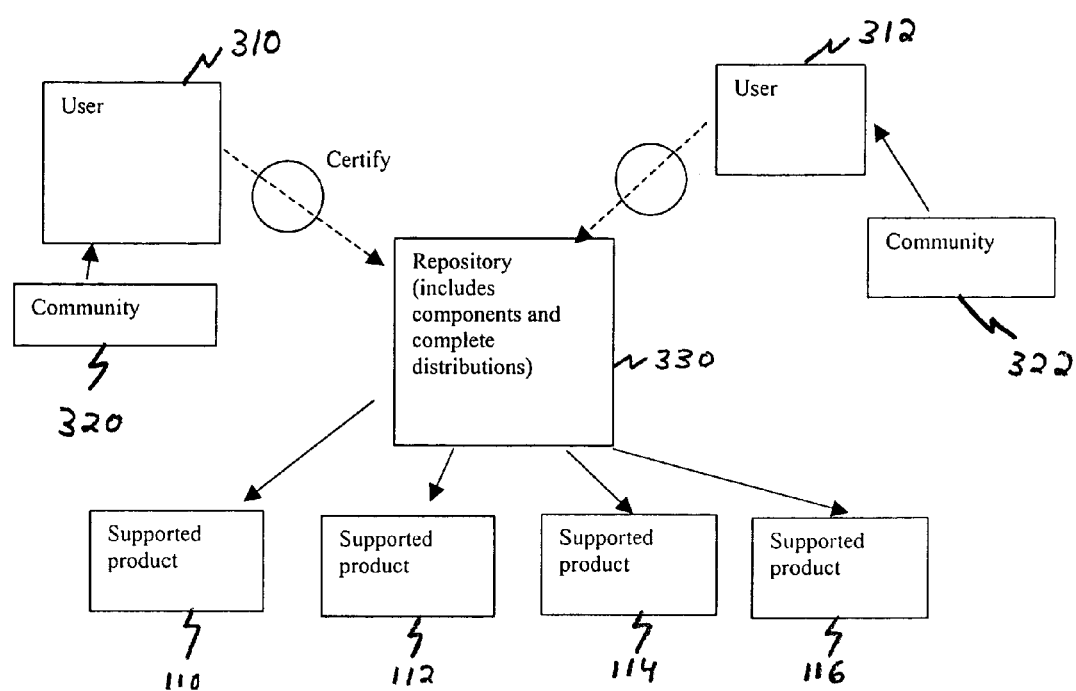
FIG. 3 depicts a collaborative system by which multiple parties maintain a sharable base of software units that represent software features submitted by the parties, and generate a plurality of different software builds, in accordance with the present invention.

Referring now to FIG. 3, there is shown a collaborative system 300 by which multiple parties (e.g., users 310, 312) maintain a sharable base (e.g., included in repository 330) of software units that represent software features submitted by the parties, and generate a plurality of different software builds 110, 112, 114, 116, in accordance with the present invention. System 300 may be implemented using one or more servers (not shown) coupled to repository 330. The dashed arrows leading into the repository 330 signify that contributions are divided into parts as they travel into the repository. Each contribution may take the form of a working testable build constructed based on components and assembly instructions. The content returning to the repository 330 consists of:

1. New content in the form of components. Each component represents, for example, a single feature where the definition of feature is qualitative, but in general it could be characterized as the smallest unit of content that adds a definable unit of value; e.g., adds support for an I/O device, fixes a bug, or extends the range of supported priorities; and 2. Integration instructions that combine components in the repository with any new content. The integration instructions are a special case of a component and are generally likely to be expressed as a combination of existing sets of instructions with the possible addition of novel assembly instructions.

In the present invention, contributions must run through a certification process before being entered in the repository 330. This certification process serves two purposes. It tests the product to ensure that it is complete and correct to an acceptable degree. It also inspects the components of the product for conformance to the standards that govern the repository.

From a system point of view, the collaboration system 300 offers its users all the components, software, and practices required to create a commercial-quality manufactured product/distribution. In addition to a shareable base of software units, repository 330 preferably includes software that implements the methodologies discussed above in connection with FIGS. 1 and 2, in order to allow users to create products/distributions by easily combining those components. Users 310, 312 can also add components to the repository either for their private use or as part of a resource available to one or more communities 320, 322. Components that are contributed to the community resource are certified, and become supported components. Private components must be supported by the community that can access them.

In one embodiment, before a product/distribution is accepted as a "supported" distribution, it must pass through certification. This is a key step which protects the repository from pollution. Most important, it prevents unsupportable products/distributions from becoming an unbounded load on the system.

In one embodiment, system 300 includes component-oriented functionality that makes it easy to add patches from a greater community (e.g., community 320 or 322). Most kernel enhancements and many enhancements to other components are maintained in the form of patches so this orientation makes moving features into collaboration system 300 (and submitting them back to the greater community) relatively easy. The component orientation functionality enhances scalability.

In one embodiment, repository 330 may consist entirely of components (where the instructions for building distributions are also treated as components). There are many components, but in aggregate the code is unlikely to grow even as large as two complete distributions. The components can be assembled into a number of different distributions proportional to $2^n$ where n is the number of components in the system, but the novel content of any distribution is generally small, and always well-identified. The support load scales with the number and size of the components, not with the number and size of the generated distributions.

In one embodiment, collaboration system 300 comprises a distributed system including the central repository 330 and client tools that ease interaction with the repository. Certification includes numerous tests, and system 300 preferably includes a tool that runs the tests and collects the test results into a database/report than can be bound to the submitted components such that the test results and the scope of testing for any component becomes part of that component. This database of "This component has been tested in these combinations, on these environments, with these results" can be an important factor in making the components reusable because it provides a user with information representing how much "experience" a component has in comparable systems.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A collaborative method by which multiple parties maintain a sharable base of software units that represent software features submitted by the parties, and generate a plurality of different software builds, wherein each of the different software builds is generated from a common base code and one or more different software units, the method comprising:
   (a) maintaining the common base code in a central code repository;
   (b) providing a common certification standard accepted by each of the different parties submitting additions;
   (c) for each different software build associated with a given software unit submitted by one of the parties, determining that the build is a certified build if the build is in conformance with the common certification standard; and
   (d) associating a certification history with each software unit stored in the central code repository;
   wherein the plurality of software builds include at least first and second software builds that are related in accordance with a directed acyclic graph (DAG), wherein the common base code corresponds to a root of the DAG, and the first and second software builds are each represented on a different branch of the DAG.

2. The method of claim 1, wherein the integrity of software units stored in the central code repository is measured by the common certification procedure.

3. The method of claim 2, where the common certification procedure is directed at complete builds incorporating one or more of the units stored in the central code repository.

4. The method of claim 1, further comprising:
   (e) repeating steps (c) and (d) for each software unit that a party submits to the central code repository; and
   (f) providing each of the different parties with access to the common base code stored in the code repository, at least a subset of software units stored in the central code repository, and at least a subset of the certified builds stored in the central code repository.

5. A system by which multiple parties collaborate to maintain a sharable base of software units that represent software features submitted by the parties, and generate a plurality of different software builds, wherein each of the different software builds is generated from a common base code and one or more different software units, comprising:
   (a) a central code repository that maintains the common base code;
   (b) a common certification standard accepted by each of the different parties submitting additions; and
   (c) at least one server, coupled to the central code repository, wherein, for each different software build associated with a given software unit submitted by one of the parties, the at least one server determines that the build is a certified build if the build is in conformance with the common certification standard and associates a certification history with each software unit stored in the central code repository;
   wherein the plurality of software builds include at least first and second software builds that are related in accordance with a directed acyclic graph (DAG), and wherein the common base code corresponds to a root of the DAG, and the first and second software builds are each represented on a different branch of the DAG.

6. A method of generating a plurality of different software builds, wherein each of the different software builds is generated from a common base code and different components selected from a set of components, comprising:
(a) for each different software build, recursively applying steps (a)(i) through (a)(iii) to generate components used by the build:
  (i) applying the common code and a combination of two or more components making up the build to a system that automatically detects potential conflicts associated with the combination of components;
  (ii) generating a resolution for each potential conflict detected in step(a)(i); and
  (iii) using a computer-implemented merge system to generate the software build from the common code, the combination of components associated with the build, and each resolution generated for the build in step (a)(ii);
(b) in response to receipt of a code update to an earlier version of either the common code or a given component in the set, automatically identifying each software build previously generated using the earlier version;
(c) for each software build identified in step (b), recursively applying steps (c)(i) to (c)(iii) to update components associated with the build:
  (i) applying the code update and any other code or components associated with the build to a system that automatically detects potential conflicts associated with the code update;
  (ii) generating a resolution for each potential conflict detected in step(c)(i); and
  (iii) using the computer-implemented merge system to generate the software build from the code update, any other code or components associated with the build, and each resolution generated for the build in step (c)(ii); and
(d) repeating steps (b) and (c) as further updates are received for either the common code or components in the set;
wherein the plurality of different software builds include at least first and second software builds that are related in accordance with a directed acyclic graph (DAG), wherein the common base code corresponds to a root of the DAG, and the first and second software builds are each represented on a different branch of the DAG.

7. The method of claim 6, wherein steps (a)(ii) and (c)(ii) are performed automatically by a computer.

8. The method of claim 6, wherein the plurality of different software builds also include at least one linear sequence of software builds.

9. A computer-implemented system for generating a plurality of different software builds, wherein each of the different software builds is generated from a common base code and different components selected from a set of components, comprising at least one server having software therein which causes the server to execute the following steps:
(a) for each different software build, recursively applying steps (a)(i) through (a)(ii) to generate components used by the build:
  (i) applying the common code and a combination of two or more components making up the build to a system that automatically detects potential conflicts associated with the combination of components; and
  (ii) using a computer-implemented merge system to generate the software build from the common code, the combination of components associated with the build, and each resolution generated for the build;
(b) in response to receipt of a code update to an earlier version of either the common code or a given component in the set, automatically identifying each software build previously generated using the earlier version;
(c) for each software build identified in step (b), recursively applying steps (c)(i) to (c)(ii) to update components associated with the build:
  (i) applying the code update and any other code or components associated with the build to a system that automatically detects potential conflicts associated with the code update;
  (ii) using the computer-implemented merge system to generate the software build from the code update, any other code or components associated with the build, and each resolution generated for the build; and
(d) repeating steps (b) and (c) as further updates are received for either the common code or components in the set;
wherein the plurality of different software builds include at least first and second software builds that are related in accordance with a directed acyclic graph (DAG), wherein the common base code corresponds to a root of the DAG, and the first and second software builds are each represented on a different branch of the DAG.

10. A method of generating a plurality of different computer hardware build designs, wherein each of the different hardware build designs is generated from a common collection of hardware elements and different hardware components selected from a set of hardware components, comprising:
(a) for each different hardware build design, recursively applying steps (a)(i) through (a)(iii) to generate components used by the build:
  (i) applying information representing characteristics of the common collection of hardware elements and information representing characteristics of a combination of one or more hardware components associated with the build design to a system that automatically detects any conflicts associated with the combination of components;
  (ii) generating a resolution for each potential conflict detected in step(a)(i); and
  (iii) using a computer-implemented merge system to generate the hardware build design from the information representing the characteristics of the common collection of hardware elements, the information representing the characteristics of the combination of one or more hardware components associated with the build design, and each resolution generated for the build design in step (a)(ii);
(b) in response to receipt of an update to an earlier version of the information representing either the common collection of hardware elements or a given hardware component in the set, automatically identifying each hardware build design previously generated using the earlier version;
(c) for each hardware build design identified in step (b), recursively applying steps (c)(i) to (c)(iii) to update information representing the characteristics of hardware components in the build design:

(i) applying the update to a merge system that automatically detects any potential conflicts associated with the hardware build design;

(ii) generating a resolution for each potential conflict detected in step(c)(i); and (iii) using the merge system to generate the hardware build design from the update and each resolution generated for the hardware build design in step (c)(ii); and (d) repeating steps (b) and (c) as further updates are received for either the common collection of hardware elements or components in the set;

wherein the plurality of different hardware build designs includes at least a first and second hardware build designs that are related in accordance with a directed acyclic graph (DAG), wherein the common collection of hardware elements corresponds to a root of the DAG, and the first and second hardware build designs are each represented on a different branch of the DAG.

11. The method of claim 10, wherein steps (a)(ii) and (c)(ii) are performed automatically by a computer.

12. The method of claim 10, wherein the plurality of different hardware build designs also include at least one linear sequence of hardware build designs.

13. A computer-implemented system for generating a plurality of different computer hardware build designs, wherein each of the different hardware build designs is generated from a common collection of hardware elements and different hardware components selected from a set of hardware components, comprising at least one server having software therein which causes the server to execute the following steps:

(a) for each different hardware build design, recursively applying steps (a)(i) through (a)(ii) to generate components used by the build:

(i) applying information representing characteristics of the common collection of hardware elements and information representing characteristics of a combination of one or more hardware components associated with the build design to a system that automatically detects any conflicts associated with the combination of components;

(ii) using a computer-implemented merge system to generate the hardware build design from the information representing the characteristics of the common collection of hardware elements, the information representing the characteristics of the combination of one or more hardware components associated with the build design, and each resolution generated for the build design;

(b) in response to receipt of an update to an earlier version of the information representing either the common collection of hardware elements or a given hardware component in the set, automatically identifying each hardware build design previously generated using the earlier version;

(c) for each hardware build design identified in step (b), recursively applying steps (c)(i) to (c)(ii) to update information representing the characteristics of hardware components in the build design:

(i) applying the update to a merge system that automatically detects any potential conflicts associated with the hardware build design;

(ii) using the merge system to generate the hardware build design from the update and each resolution generated for the hardware build design in step (c)(i); and (d) repeating steps (b) and (c) as further updates are received for either the common collection of hardware elements or components in the set;

wherein the plurality of different hardware build designs includes at least a first and second hardware build designs that are related in accordance with a directed acyclic graph (DAG), wherein the common collection of hardware elements corresponds to a root of the DAG, and the first and second hardware build designs are each represented on a different branch of the DAG.

* * * * *